(12) United States Patent
Yamazaki et al.

(10) Patent No.: US 9,035,859 B2
(45) Date of Patent: May 19, 2015

(54) DISPLAY DEVICE

(75) Inventors: Shunpei Yamazaki, Setagaya (JP); Jun Koyama, Sagamihara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 242 days.

(21) Appl. No.: 13/367,711

(22) Filed: Feb. 7, 2012

(65) Prior Publication Data

US 2012/0206325 A1    Aug. 16, 2012

(30) Foreign Application Priority Data

Feb. 16, 2011    (JP) .................................. 2011-031103

(51) Int. Cl.
*G09G 3/36*    (2006.01)
*G09G 3/00*    (2006.01)
(Continued)

(52) U.S. Cl.
CPC .............. *G09G 3/003* (2013.01); *G09G 3/3611* (2013.01); *G02F 1/13471* (2013.01); *G02B 27/2214* (2013.01); *H04N 13/0409* (2013.01); *H04N 13/0452* (2013.01); *G02B 27/0093* (2013.01); *H04N 13/0413* (2013.01); *H04N 13/0475* (2013.01)

(58) Field of Classification Search
CPC .. G09G 3/003; G09G 3/3611; G02F 1/13471; G02B 27/0093; G02B 27/2214; H04N 13/0409; H04N 13/0452
USPC .............. 345/87, 694, 697; 359/15, 462, 464, 359/466
See application file for complete search history.

(56) References Cited

U.S. PATENT DOCUMENTS 6,597,348 B1    7/2003    Yamazaki et al.
6,882,012 B2    4/2005    Yamazaki et al.
(Continued)

FOREIGN PATENT DOCUMENTS

CN    1834729    9/2006
CN    102006491    4/2011
(Continued)

OTHER PUBLICATIONS

International Search Report (Application No. PCT/JP2012/052193) Dated Apr. 17, 2012.
(Continued)

*Primary Examiner* — Amare Mengistu
*Assistant Examiner* — Jennifer Zubajlo
(74) *Attorney, Agent, or Firm* — Eric J. Robinson; Robinson Intellectual Property Law Office, P.C.

(57) ABSTRACT

A display device includes a display panel and a shutter panel that is provided on the viewer side of the display panel and includes a first liquid crystal element and a second liquid crystal element adjacent to each other. In a first display state, a first light-shielding region and a first light-transmitting region are formed in the shutter panel by the first liquid crystal element, and light from the display panel is emitted through the first light-transmitting region. In a second display state, a second light-shielding region larger than the first light-shielding region and a second light-transmitting region smaller than the first light-transmitting region are formed in the shutter panel by the first liquid crystal element and the second liquid crystal element, and light from the display panel is emitted through the second light-transmitting region.

12 Claims, 9 Drawing Sheets

(51) Int. Cl.
*G02F 1/1347* (2006.01)
*G02B 27/22* (2006.01)
*H04N 13/04* (2006.01)
*G02B 27/00* (2006.01)

(56) References Cited

U.S. PATENT DOCUMENTS

| | | | |
|---|---|---|---|
| 6,970,290 B1 * | 11/2005 | Mashitani et al. | 359/462 |
| 7,145,536 B1 | 12/2006 | Yamazaki et al. | |
| 7,193,593 B2 | 3/2007 | Koyama et al. | |
| 7,224,339 B2 | 5/2007 | Koyama et al. | |
| 7,268,756 B2 | 9/2007 | Koyama et al. | |
| 7,317,438 B2 | 1/2008 | Yamazaki et al. | |
| 7,385,579 B2 | 6/2008 | Satake | |
| 7,425,937 B2 | 9/2008 | Inukai | |
| 7,609,445 B2 | 10/2009 | Hamagishi | |
| 7,791,571 B2 | 9/2010 | Ohtani et al. | |
| 2005/0012097 A1 | 1/2005 | Yamazaki | |
| 2006/0209371 A1 * | 9/2006 | Hamagishi | 359/15 |
| 2007/0279359 A1 | 12/2007 | Yoshida et al. | |
| 2007/0279374 A1 | 12/2007 | Kimura et al. | |
| 2009/0321737 A1 | 12/2009 | Isa et al. | |
| 2010/0148177 A1 | 6/2010 | Koyama et al. | |
| 2010/0182282 A1 | 7/2010 | Kurokawa et al. | |
| 2011/0051239 A1 * | 3/2011 | Daiku | 359/464 |
| 2011/0157696 A1 | 6/2011 | Bennett et al. | |
| 2012/0206446 A1 * | 8/2012 | Yamazaki et al. | 345/419 |
| 2012/0218325 A1 * | 8/2012 | Hiroki et al. | 345/697 |
| 2012/0287359 A1 * | 11/2012 | Yamazaki et al. | 349/15 |

FOREIGN PATENT DOCUMENTS

| | | |
|---|---|---|
| EP | 1087627 A | 3/2001 |
| EP | 1703743 A | 9/2006 |
| JP | 03-119889 | 5/1991 |
| JP | 08-036145 | 2/1996 |
| JP | 2001-166259 A | 6/2001 |
| JP | 2003-259395 | 9/2003 |
| JP | 2005-092103 | 4/2005 |
| JP | 2005-258013 | 9/2005 |
| JP | 2006-259191 A | 9/2006 |
| JP | 2011-053277 A | 3/2011 |
| KR | 2006-0101298 A | 9/2006 |
| KR | 2007-0051797 A | 5/2007 |
| KR | 2007-0051798 A | 5/2007 |
| KR | 2007-0052249 A | 5/2007 |
| KR | 2011-0023842 A | 3/2011 |

OTHER PUBLICATIONS

Written Opinion (Application No. PCT/JP2012/052193) Dated Apr. 17, 2012.
Kamiya et al., "Carrier transport properties and electronic structures of amorphous oxide semiconductors: the present status," Solid State Physics, Sep. 1, 2009, vol. 44, No. 9, pp. 621-633, Agne Gijutsu Center.

* cited by examiner

FIG. 4A1 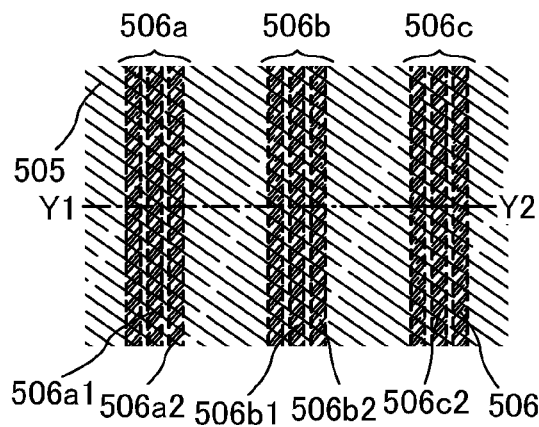
FIG. 4A2 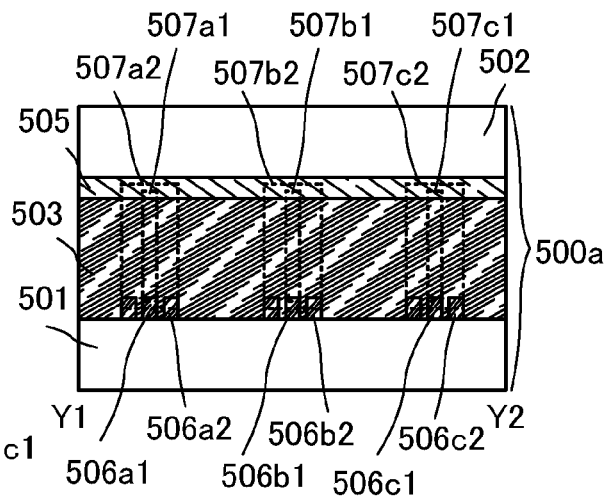
FIG. 4B1 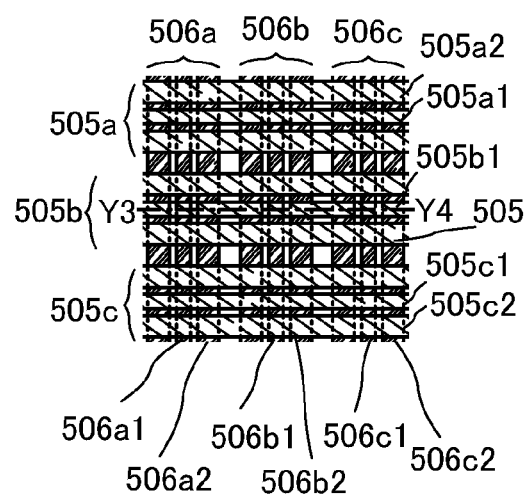
FIG. 4B2 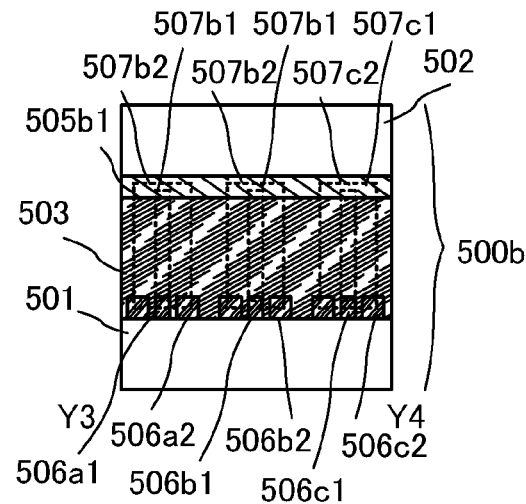
FIG. 4C1 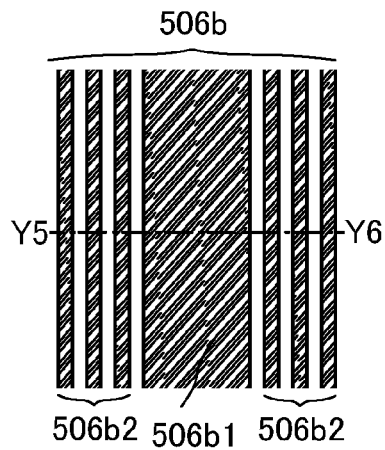
FIG. 4C2 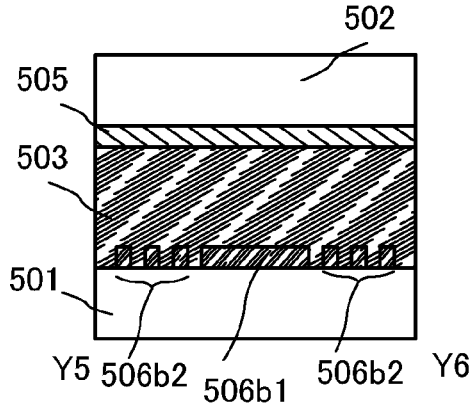

DISPLAY DEVICE

TECHNICAL FIELD

The present invention relates to display devices and particularly relates to a display device capable of displaying three-dimensional (3D) images.

BACKGROUND ART

Display devices are widely used, ranging from large display devices such as television devices to small display devices such as mobile phones. High value-added products will be needed and are being developed. In recent years, display devices that can display 3D images have been developed in order to display more realistic images.

As methods for displaying 3D images, there are a method using glasses for separating an image seen with a left eye and an image seen with a right eye (also referred to as stereoscopy), and autostereoscopy by which 3D images can be seen by the naked eye by addition of a structure for separating an image seen with a left eye and an image seen with a right eye in a display portion. It is not necessary to prepare glasses to see autostereoscopic 3D images, which offers a high convenience. Autostereoscopic 3D display is coming into widespread use such as mobile phones and mobile game consoles.

As a method for displaying autostereoscopic 3D images, there is known a parallax barrier method in which a parallax barrier is added to a display portion. A parallax barrier for this method is a stripe-shaped light-shielding portion and causes a decrease in resolution when display is switched from 3D display to 2D display. In view of this, for a parallax barrier method, there is suggested a structure in which a liquid crystal panel having a patterned transparent electrode is used, and when display is switched between 2D display and 3D display, transmission or shielding of light by a liquid crystal layer is controlled by controlling voltage applied to the transparent electrode in order to set the presence or absence of a parallax barrier (see Patent Document 1).

[Reference]

Patent Document 1: Japanese Published Patent Application No. 2005-258013

DISCLOSURE OF INVENTION

However, in order to display 3D images by a parallax barrier method, a specific distance is needed between a display screen and the eye of a viewer.

In view of the above, an object of one embodiment of the present invention is to increase the range of distance (between a display screen and the eye of a viewer) with which the viewer can see 3D images by the naked eye.

According to one embodiment of the present invention, a display device includes a display panel and a shutter panel that is provided on a viewer side of the display panel and includes a first liquid crystal element and a second liquid crystal element adjacent to the first liquid crystal element. In a first display state, a first light-shielding region and a first light-transmitting region are formed in the shutter panel by the first liquid crystal element, and light from the display panel is emitted through the first light-transmitting region. In a second display state, a second light-shielding region larger than the first light-shielding region and a second light-transmitting region smaller than the first light-transmitting region are formed in the shutter panel by the first liquid crystal element and the second liquid crystal element, and light from the display panel is emitted through the second light-transmitting region.

According to another embodiment of the present invention, a display device includes a display panel; a shutter panel that is provided on a viewer side of the display panel and includes a first liquid crystal element and a second liquid crystal element adjacent to the first liquid crystal element; and a sensor configured to detect a distance and an angle between the shutter panel and a viewer. In a first display state, a first light-shielding region and a first light-transmitting region are formed in the shutter panel by the first liquid crystal element, and light from the display panel is emitted through the first light-transmitting region. In a second display state, a second light-shielding region larger than the first light-shielding region and a second light-transmitting region smaller than the first light-transmitting region are formed in the shutter panel by the first liquid crystal element and the second liquid crystal element, and light from the display panel is emitted through the second light-transmitting region. One of the first display state and the second display state is selected in accordance with the distance and the angle detected by the sensor.

In the above display device, the second liquid crystal elements can be provided on both sides of the first liquid crystal element. In addition, the display panel can include a pixel unit including a first pixel and a second pixel adjacent to each other, and the pitch of the first light-shielding region can be larger than that of the pixel unit.

According to one embodiment of the present invention, the range of distance with which a viewer can see 3D images by the naked eye can be increased. A highly convenient display device can be provided as a result.

BRIEF DESCRIPTION OF DRAWINGS

In the accompanying drawings:

FIGS. 4A1, 4A2, 4B1, 4B2, 4C1, and 4C2 illustrate embodiments of shutter panels;

BEST MODE FOR CARRYING OUT THE INVENTION

Figure 1A:
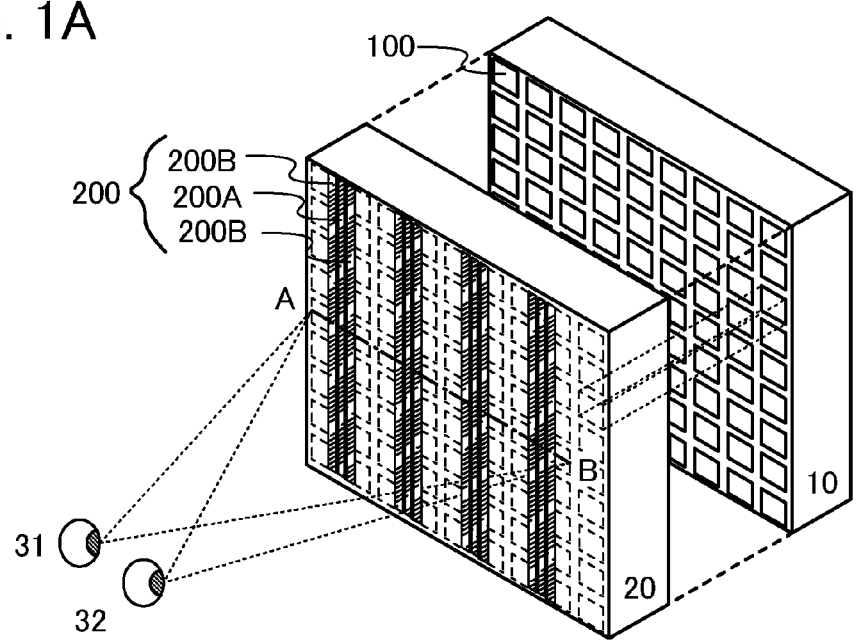
FIGS. 1A and 1B are schematic diagrams each illustrating a display device.

Embodiments of the present invention will be hereinafter described with reference to the accompanying drawings. Note that the present invention can be carried out in many different modes, and it is easily understood by those skilled in the art that modes and details of the present invention can be modified in various ways without departing from the spirit and scope of the present invention. Therefore, the present invention should not be construed as being limited to the following description of the embodiments. Note that in structures of the present invention described below, reference numerals denoting the same portions are used in common in different drawings.

Note that the size, the thickness of a layer, signal waveform, and a region in structures illustrated in the drawings and the like in the embodiments are exaggerated for simplicity in some cases. Therefore, the scale is not necessarily limited to that illustrated in the drawings and the like.

Note that in this specification and the like, the terms "first", "second", "third", and "N-th" (N is a natural number) are used in order to avoid confusion between components and thus do not limit the number of the components. The natural number is 1 or more unless otherwise specified.

(Embodiment 1)

First, a display device according to one embodiment of the present invention will be described with reference to FIGS. 1A and 1B, FIGS. 2A to 2C, and FIGS. 3A and 3B.

Figure 1B:
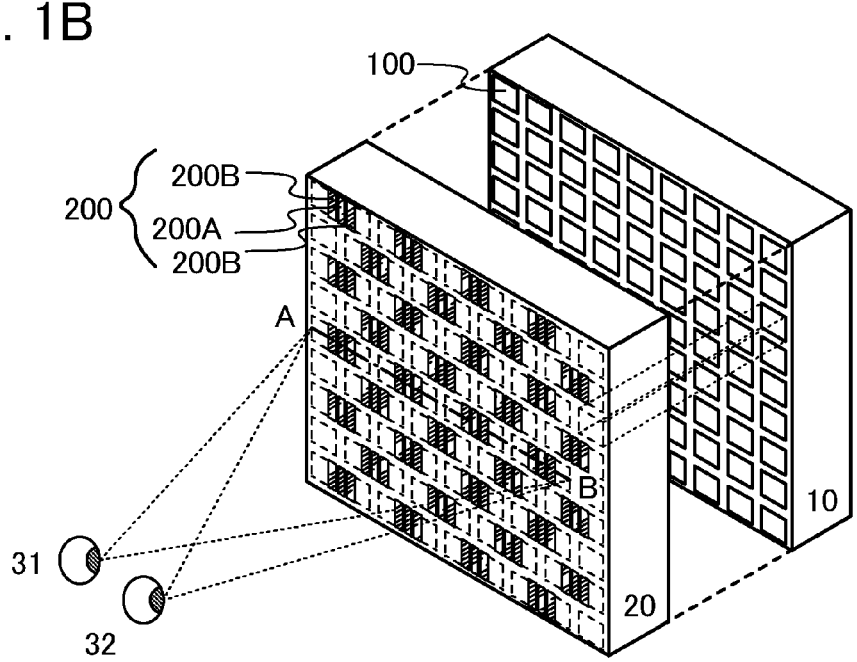

FIGS. 1A and 1B are schematic diagrams each illustrating a display device according to one embodiment of the present invention. The display device illustrated in FIG. 1A includes a display panel 10 in which a plurality of pixels 100 are arranged in matrix, and a shutter panel 20 in which first liquid crystal elements 200A and second liquid crystal elements 200B are adjacent to each other and arranged in a stripe pattern. The display device illustrated in FIG. 1B includes a display panel 10 in which a plurality of pixels 100 are arranged in matrix, and a shutter panel 20 in which first liquid crystal elements 200A and second liquid crystal elements 200B are adjacent to each other and arranged in matrix. FIGS. 1A and 1B illustrate a left eye 31 and a right eye 32 of a viewer in order to show a state of the viewer's perception.

The shutter panel 20 is provided in the direction where light is emitted from the display panel 10, that is, on the side viewed by the viewer of the display device. The shutter panel 20 can block display viewed by the viewer with the use of the plurality of first liquid crystal elements 200A and/or the plurality of second liquid crystal elements 200B. Specifically, the shutter panel 20 can have a first display state or a second display state in accordance with a light-emitting state or a light-shielding state of the first liquid crystal elements 200A and/or the second liquid crystal elements 200B. Note that in the shutter panel 20, display to be viewed by the viewer is not blocked except in the regions of the plurality of first liquid crystal elements 200A and/or the plurality of second liquid crystal elements 200B. In the shutter panel 20, in the first display state, a first light-shielding region is formed using the first liquid crystal elements 200A, and a first light-transmitting region is formed in portions except the first light-shielding region. In the second display state, a second light-shielding region is formed using the first liquid crystal elements 200A and the second liquid crystal elements 200B, and a second light-transmitting region is formed in portions except the second light-shielding region. Note that the number of light-shielding regions formed using the first liquid crystal elements 200A and/or the second liquid crystal elements 200B is one example and can be increased.

When a combination of the first liquid crystal element 200A and the second liquid crystal elements 200B described in this embodiment is regarded as an optical shutter region 200, the optical shutter region 200 can function as a parallax barrier. The optical shutter regions 200 functioning as a parallax barrier in one embodiment of the present invention are arranged in a stripe pattern or in matrix as illustrated in FIG. 1A or FIG. 1B, and have a function of adjusting the width of the optical shutters arranged in a stripe pattern or in matrix. Specifically, for example, only the first liquid crystal elements 200A function as a parallax barrier in the initial state, and the first liquid crystal elements 200A and/or the second liquid crystal elements 200B can function as a parallax barrier in accordance with a state of the viewer's perception. In other words, the shutter panel 20 including the optical shutter regions 200 described in this embodiment can vary the width of the parallax barrier in accordance with a state of the viewer's perception.

It is preferable that the width of the first liquid crystal element 200A and the second liquid crystal element 200B (the length in the minor axis direction in a state where the liquid crystal elements form a stripe) described in this embodiment be set smaller than the pitch of the pixel 100 which is the repeating unit. In the optical shutter regions 200 designed in the above manner in this embodiment, transmission or shielding of light by the first liquid crystal element 200A and the second liquid crystal element 200B is individually controlled, whereby the width of the optical shutter regions 200 serving as a parallax barrier can be easily adjusted. Note that the size of the light-shielding region formed using the second liquid crystal elements 200B is preferably larger than that of the light-shielding region formed using the first liquid crystal elements 200A. With such a structure, the area where the viewer can see 3D images can be expanded.

Note that a pixel corresponds to a display unit obtained by combining a plurality of sub-pixels that are elements whose brightness can be controlled. A plurality of sub-pixels form a display unit where the brightness of color elements of red (R), green (G), and blue (B), which are a combination for displaying color images, can be controlled. Note that the colors of the color elements for displaying color images are not limited to three colors of RGB, and may be more than three colors or may include a color other than RGB.

Figure 2A:
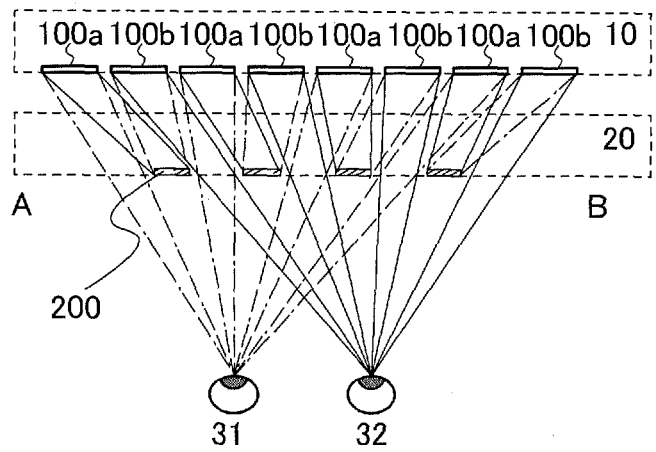
FIGS. 2A to 2C illustrate the relation between a light-shielding portion, a display panel, and a viewer.
Figure 2B:
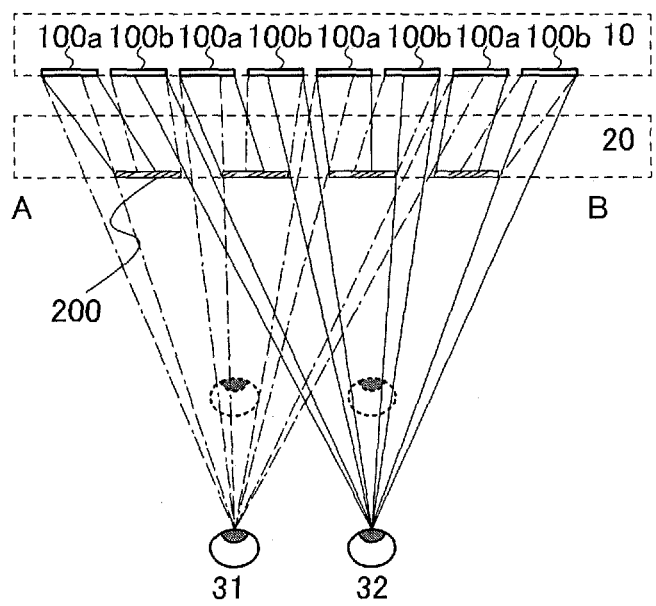
Figure 2C:
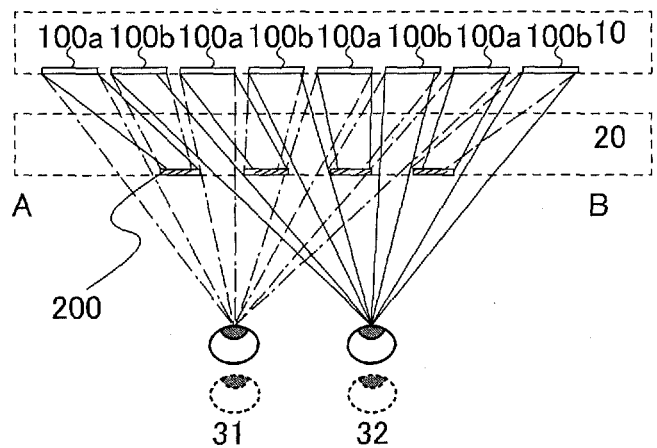

FIGS. 2A to 2C schematically illustrate the structure of the display device along dashed line A-B in FIGS. 1A and 1B with varying distance between the left eye 31 and the right eye 32 of the viewer and the display panel 10. Among FIGS. 2A to 2C, with reference to the distance between the left eye 31 and the right eye 32 of the viewer and the display panel 10 in FIG. 2A, FIG. 2B shows the case where the left eye 31 and the right eye 32 of the viewer are farther from the display panel 10, and FIG. 2C shows the case where the left eye 31 and the right eye 32 of the viewer are closer to the display panel 10.

FIGS. 2A to 2C will be compared to each other. When the viewer looks at the display device from the distance in FIG. 2A, the optical shutter regions 200 are positioned so that one of the left eye 31 and the right eye 32 perceives display on a given pixel 100 directly (without through the optical shutter region 200) and the other of the left eye 31 and the right eye 32 perceives display on the given pixel 100 without through the optical shutter region 200.

When the viewer looks at the display device from the distance in FIG. 2A, the left eye 31 directly perceives display on pixels 100a (see chain lines in FIG. 2A), whereas the right eye 32 does not perceive the display on the pixels 100a because the optical shutter regions 200 are placed therebetween (see solid lines in FIG. 2A). Moreover, the left eye 31 does not perceive display on pixels 100b (see chain lines in FIG. 2A), whereas the right eye 32 perceives the display on the pixels 100b because the optical shutter regions 200 are not placed therebetween (see solid lines in FIG. 2A). Accordingly, the generation of binocular parallax between the left eye 31 and the right eye 32 can make the viewer perceive 3D display.

When the viewer looks at the display device from the distance in FIG. 2B, that is, when the viewer looks at the display device from far away, the optical shutter regions 200 positioned as in FIG. 2A cannot make the left eye 31 and the right eye 32 perceive display on the pixels 100a and display on the pixels 100b separately because the viewer sees a mixture of the display on the pixels 100a and the display on the pixels 100b. In light of this, in the shutter panel 20 including the optical shutter regions 200 described in this embodiment, the width of the parallax barrier is variable in accordance with a state of the viewer's perception.

In the case of FIG. 2B, the light-shielding region formed using the liquid crystal elements in the optical shutter regions 200 is extended so that the width of the parallax barrier by the optical shutter regions 200 is larger than that of the parallax barrier in FIG. 2A. Accordingly, also in FIG. 2B, the left eye 31 directly perceives display on the pixels 100a (see chain lines in FIG. 2B), whereas the right eye 32 does not perceive the display on the pixels 100a because the optical shutter regions 200 are placed therebetween (see solid lines in FIG. 2B). Moreover, the left eye 31 does not perceive display on the pixels 100b (see chain lines in FIG. 2B), whereas the right eye 32 perceives the display on the pixels 100b because the optical shutter regions 200 are not placed therebetween (see solid lines in FIG. 2B). Accordingly, when looking at the display device from a distance, the viewer can perceive 3D display by generation of binocular parallax between the left eye 31 and the right eye 32.

When the viewer looks at the display device from the distance in FIG. 2C, that is, when the viewer looks at the display device at a close distance from the display device, the optical shutter regions 200 positioned as in FIG. 2A cannot make the left eye 31 and the right eye 32 perceive display on the pixels 100a and display on the pixels 100b separately because the viewer sees a mixture of the display on the pixels 100a and the display on the pixels 100b. In light of this, in the shutter panel 20 including the optical shutter regions 200 described in this embodiment, the width of the parallax barrier is variable in accordance with a state of the viewer's perception.

In the case of FIG. 2C, the light-shielding region formed using the liquid crystal elements in the optical shutter regions 200 is extended so that the width of the parallax barrier by the optical shutter regions 200 is larger than that of the parallax barrier in FIG. 2A. Accordingly, also in FIG. 2C, the left eye 31 directly perceives display on the pixels 100a (see chain lines in FIG. 2C), whereas the right eye 32 does not perceive the display on the pixels 100a because the optical shutter regions 200 are placed therebetween (see solid lines in FIG. 2C). Moreover, the left eye 31 does not perceive display on the pixels 100b (see chain lines in FIG. 2C), whereas the right eye 32 perceives the display on the pixels 100b because the optical shutter regions 200 are not placed therebetween (see solid lines in FIG. 2C). Accordingly, when looking at the display device at a closer distance from the display device, the viewer can perceive 3D display by generation of binocular parallax between the left eye 31 and the right eye 32.

When 2D images are to be displayed, the optical shutter regions 200 do not block display on the pixels 100a and display on the pixels 100b perceived by the left eye 31 or the right eye 32, so that both eyes of the viewer can perceive display on the pixels 100a and 100b. Consequently, switching between 3D display and 2D display by the shutter panel 20 can be easily performed without decreasing the resolution.

Figure 3A:
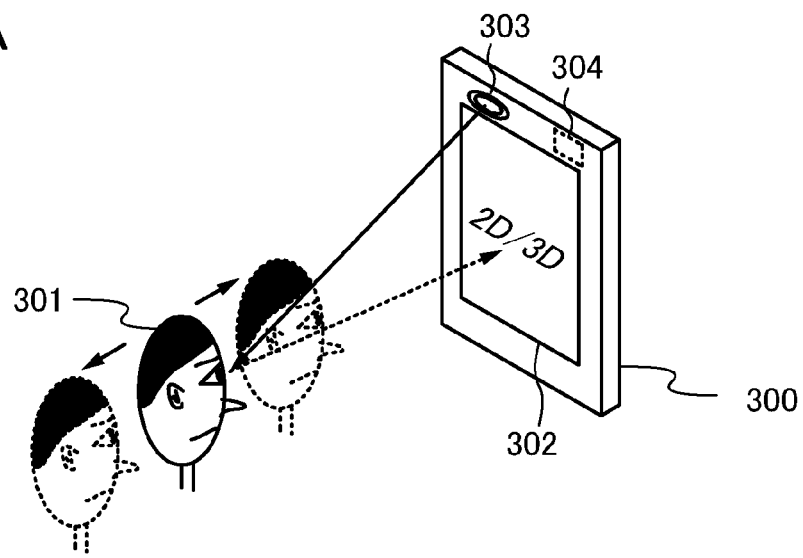
FIG. 3A is a diagram illustrating an application example of a display device.

Next, FIG. 3A is a schematic diagram illustrating an application example of the above-described display device in this embodiment, used by the viewer.

FIG. 3A shows a display device 300 and a viewer 301. The display device 300 includes a distance sensor 303 and an angular sensor 304 in addition to a display portion 302 including the above-described display panel and shutter panel. The distance sensor 303 and the angular sensor 304 are provided as means for measuring the distance between the display device 300 and the viewer 301, and shown as one structure example for measuring the distance.

The distance sensor 303 and the angular sensor 304, which are the measurement means, measure the distance between the display device 300 and the viewer 301. The distance between the display device 300 and the viewer 301 is preferably measured with high accuracy, for example, by a combination of distance detection by the distance sensor 303 such as an infrared sensor and angular detection by the angular sensor 304 such as a gyro sensor. In the display device 300, the width of the parallax barrier formed using the first liquid crystal element 200A and the second liquid crystal element 200B in the shutter panel 20 is variable in accordance with the aforementioned distance. Specifically, the display state can be selectively switched between the first display state and the second display state in accordance with the distance between the display device 300 and the viewer 301. Thus, the display device in this embodiment can make the viewer perceive 3D display by generating binocular parallax between the left eye and the right eye even if the viewer 301 looks at the display portion 302 without fixing the distance with the display device 300.

Figure 3B:
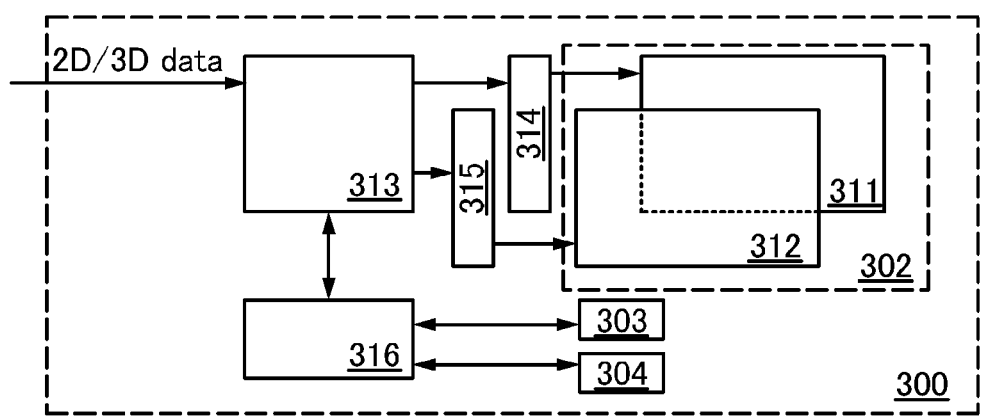
FIG. 3B is a block diagram of the display device.

FIG. 3B is a block diagram of the display device 300 including the distance sensor 303 and the angular sensor 304 described with reference to FIG. 3A. The display device 300 illustrated in the block diagram of FIG. 3B includes a display panel 311, a shutter panel 312, an application processor 313, a display panel control circuit 314, a shutter panel control circuit 315, and a sensor control circuit 316 in addition to the display portion 302, the distance sensor 303, and the angular sensor 304 described in FIG. 3A.

The display panel 311 and the shutter panel 312 included in the display portion 302 are the display panel and the shutter panel described using FIGS. 1A and 1B, which means that 3D images can be displayed even when the distance between the display device and the viewer is changed.

The sensor control circuit 316 can measure the distance with the viewer by the distance sensor 303 and the angular sensor 304. Data on the distance between the display device and the viewer, obtained by the sensor control circuit 316, is output to the application processor 313.

The application processor 313 is supplied with image data for 2D display or 3D display from the outside. The application processor 313 controls the display panel control circuit 314 in accordance with image data supplied from the outside. The display panel control circuit 314 controls display of images on the display panel 311. Further, the application processor 313 controls the shutter panel control circuit 315 in accordance with data on the distance between the display device and the viewer, supplied from the sensor control circuit 316. The shutter panel control circuit 315 controls the shutter panel 312.

With the above-described structure in this embodiment, the range of distance with which the viewer can see 3D images by the naked eye can be increased; therefore, a highly convenient display device can be provided.

This embodiment can be implemented in appropriate combination with the structures described in the other embodiments.

(Embodiment 2)

In this embodiment, specific examples of a shutter panel in the display device according to one embodiment of the present invention will be described with reference to FIGS. 4A1, 4A2, 4B1, 4B2, 4C1, and 4C2 and FIGS. 5A and 5B.

The shutter panel described in this embodiment is a specific example of the shutter panel 20 in Embodiment 1.

The shutter panel is constituted by a plurality of optical elements whose state is switched between a light-shielding state and a light-transmitting state. As the optical element, it is preferable to use a liquid crystal element in which liquid crystal is placed between a pair of electrodes. By application of voltage to the liquid crystal element, alignment of the liquid crystal is controlled to selectively control the state (a light-shielding state or a light-transmitting state) of the liquid crystal element.

FIGS. 4A1 and 4A2 illustrate a shutter panel 500a. FIG. 4A1 is a plan view of the shutter panel 500a. FIG. 4A2 is a cross-sectional view along Y1-Y2 in FIG. 4A1.

In the shutter panel 500a, liquid crystal 503 is sandwiched between electrodes 506 (506a, 506b, and 506c) provided on a substrate 501 and an electrode 505 provided on a substrate 502. The electrodes 506 are formed as the electrodes 506a, 506b, and 506c in a stripe pattern, and the electrodes 506a, 506b, and 506c are divided into electrodes 506a1 and 506a2, 506b1 and 506b2, and 506c1 and 506c2, respectively. In this embodiment, the electrodes 506a2 (506b2 and 506c2) are placed on the both sides of the electrode 506a1 (506b1 and 506c1) so that the electrode 506a1 (506b1 and 506c1) is sandwiched therebetween. The electrode 506a1 (506b1 and 506c1) and the electrode 506a2 (506b2 and 506c2) are electrically independent of each other, and can be controlled by supplying different potentials.

In FIGS. 4A1 and 4A2, the electrode 505 is a continuous flat conductive film. Alternatively, as illustrated in FIGS. 4B1 and 4B2, it is possible that the electrode 505 is formed as electrodes 505a, 505b, and 505c in a stripe pattern like the electrodes 506a, 506b, and 506c, and the electrodes 505a, 505b, and 505c are divided into electrodes 505a1 and 505a2, 505b1 and 505b2, and 505c1 and 505c2, respectively. In this embodiment, the electrodes 505a2 (505b2 and 505c2) are placed on the both sides of the electrode 505a1 (505b1 and 505c1) so that the electrode 505a1 (505b1 and 505c1) is sandwiched therebetween. The electrode 505a1 (505b1 and 505c1) and the electrode 505a2 (505b2 and 505c2) are electrically independent of each other, and can be controlled by supplying different potentials. FIG. 4B1 is a plan view of a shutter panel 500b. FIG. 4B2 is a cross-sectional view along Y3-Y4 in FIG. 4B1. The stripe-shaped electrodes 506a, 506b, and 506c and the stripe-shaped electrodes 505a, 505b, and 505c overlap with each other in a grid pattern with liquid crystal placed therebetween, whereby liquid crystal elements can be formed in a dot pattern; thus, the light-shielding region and the light-transmitting region can be controlled more precisely.

Note that it is possible that the electrodes 505a, 505b, and 505c and the electrodes 506a, 506b, and 506c are divided into three or more electrodes, and that the electrodes have a different width.

FIGS. 4C1 and 4C2 illustrate the electrode 506b as an example of another shape applicable to the electrodes 506a, 506b, and 506c and the electrodes 505a, 505b, and 505c. FIG. 4C1 is a plan view of the electrode 506b. FIG. 4C2 is a cross-sectional view along Y5-Y6 in FIG. 4C1.

As an example, as the electrode 506b in FIGS. 4C1 and 4C2, a plurality of narrower electrodes 506b2 of a second liquid crystal element 507b2 are provided on the both sides of the electrode 506b1 of a first liquid crystal element 507b1. As described above, it is possible that the second liquid crystal element has a plurality of electrodes which are smaller in width than the electrode of the first liquid crystal element.

The electrodes 506a1, 506b1, and 506c1 and the electrodes 506a2, 506b2, and 506c2 each sandwich the liquid crystal 503 with the electrode 505 and thus form first liquid crystal elements 507a1, 507b1, and 507c1 and second liquid crystal elements 507a2, 507b2, and 507c2 adjacent to the first liquid crystal elements 507a1, 507b1, and 507c1. The first liquid crystal elements 507a1, 507b1, and 507c1 and the second liquid crystal elements 507a2, 507b2, and 507c2 can be controlled electrically independently of each other.

When 3D images are to be displayed, the light-shielding region can be selectively determined by controlling the first liquid crystal elements 507a1, 507b1, and 507c1 and the second liquid crystal elements 507a2, 507b2, and 507c2. For example, when a viewer is relatively far from the shutter panel 500a, only the first liquid crystal elements 507a1, 507b1, and 507c1 are driven to form a first light-shielding region, and a first display state can be provided as 3D display to the viewer. On the other hand, when the viewer is close to the shutter panel 500a, both the first liquid crystal elements 507a1, 507b1, and 507c1 and the second liquid crystal elements 507a2, 507b2, and 507c2 are driven to form a second light-shielding region larger than the first light-shielding region, and a second display state can be provided as 3D display to the viewer.

Figure 5A:
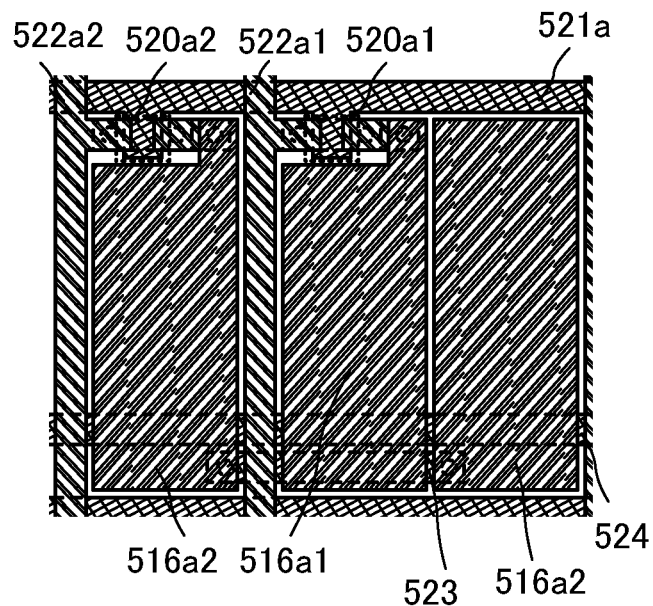
FIGS. 5A and 5B illustrate embodiments of shatter panels.
Figure 5B:
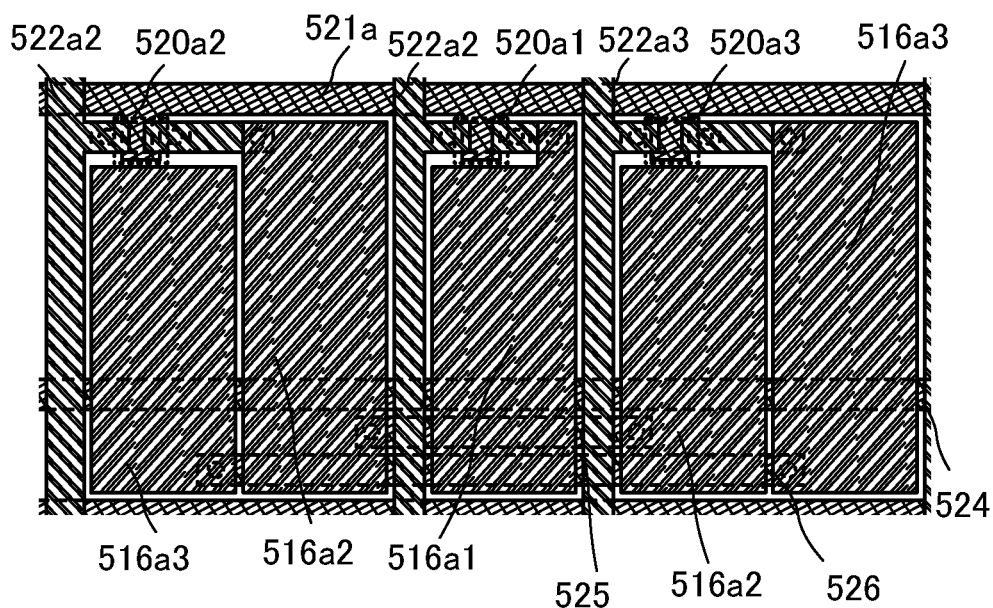

In addition, an element that functions as a switch electrically connected to a liquid crystal element can be provided to control the liquid crystal element. FIGS. 5A and 5B each illustrate an example in which a transistor is provided as an element functioning as a switch to drive a liquid crystal element.

A shutter panel in FIG. 5A includes a first liquid crystal element having an electrode 516a1 electrically connected to a transistor 520a1, a second liquid crystal element that is adjacent to the first liquid crystal element and has an electrode 516a2 electrically connected to a transistor 520a2, and a capacitor wiring 524. Although not illustrated, electrodes paired with the electrodes 516a1 and 516a2 are provided over the electrodes 516a1 and 516a2 with liquid crystal placed therebetween.

The transistors 520a1 and 520a2 are electrically connected to a wiring 521a, and electrically connected to a wiring 522a1 and a wiring 522a2, respectively. The electrodes 516a2 which are included in the second liquid crystal elements and positioned so that the electrode 516a1 is placed therebetween are electrically connected to each other through a wiring 523.

FIG. 5B shows an example in which a shutter panel further includes a third liquid crystal element that is adjacent to the second liquid crystal element and has an electrode 516a3 electrically connected to a transistor 520a3. The electrodes 516a2 which are included in the second liquid crystal elements and positioned so that the electrode 516a1 is placed therebetween are electrically connected to each other through a wiring 525. The electrodes 516a3 which are included in the third liquid crystal elements and positioned so that the electrode 516a1 and the electrodes 516a2 are placed therebetween are electrically connected to each other through a wiring 526.

FIG. 5B shows an example where the transistors 520a1, 520a2, and 520a3 are planar transistors with a top-gate structure in which a semiconductor layer, a gate insulating layer, a gate electrode layer, an interlayer insulating layer, and a source electrode layer are stacked in this order. The wirings 523, 525, and 526 and the capacitor wiring 524 can be formed in the same step as the wiring 521a.

FIGS. 5A and 5B show an example in which the sizes (areas) of the electrodes 516a1, 516a2, and 516a3 are almost the same; however, there is no particular limitation on the sizes, and the electrodes 516a1, 516a2, and 516a3 may have a different size. Further, a larger number of (three or more) liquid crystal elements may be provided on the both sides of the liquid crystal element having the electrode 516a.

When 3D images are to be displayed, the light-shielding region can be selectively determined by controlling the first liquid crystal element, the second liquid crystal element, and the third liquid crystal element. The light-shielding regions with different areas can be formed in the same shutter panel as follows, for example: a first light-shielding region formed by driving only the first liquid crystal element, a second light-shielding region formed by driving the first and second liquid crystal elements, and a third light-shielding region formed by driving the first, second, and third liquid crystal elements. When liquid crystal elements that express black at the time of voltage application are used as the first, second, and third liquid crystal elements, a light-shielding region can be extended in the shutter panel along with an increase in the number of driven liquid crystal elements.

Although not shown in this embodiment, the shutter panel is provided with an optical film such as a polarizing plate, a retardation plate, or an anti-reflection film, or the like as appropriate. For the shutter panel, a transmissive liquid crystal element with a variety of structures and a variety of liquid crystal modes can be employed.

For example, in the structure where liquid crystal is sandwiched between a pair of electrodes as shown in FIGS. 4A1 to 4C2, it is possible to use a method of controlling gray level by generating an electric field substantially vertical to the substrate to move liquid crystal molecules in the plane vertical to the substrate. Further, when the electrodes of the liquid crystal element in FIGS. 5A and 5B have a structure used for the IPS mode or the FFS mode, it is possible to use a method of controlling gray level by generating an electric field substantially parallel (horizontal) to the substrate to move liquid crystal molecules in the plane parallel to the substrate.

There is no particular limitation on the structure of the transistor used in the shutter panel; for example, a staggered transistor or a planar transistor having a top-gate structure or a bottom-gate structure can be used. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned over and below a channel formation region with a gate insulating layer provided therebetween.

This embodiment can be implemented in appropriate combination with the structures described in the other embodiments.

(Embodiment 3)

In this embodiment, examples of the structure of a display panel applicable to the display panel in Embodiment 1 will be described with reference to FIGS. 6A and 6B and FIGS. 7A and 7B.

As a display element provided in the display panel, a light-emitting element (also referred to as a light-emitting display element) or a liquid crystal element (also referred to as a liquid crystal display element) can be used. A light-emitting element includes, in its category, an element whose luminance is controlled by current or voltage, and specifically includes an inorganic electroluminescent (EL) element, an organic EL element, and the like.

Figure 6A:
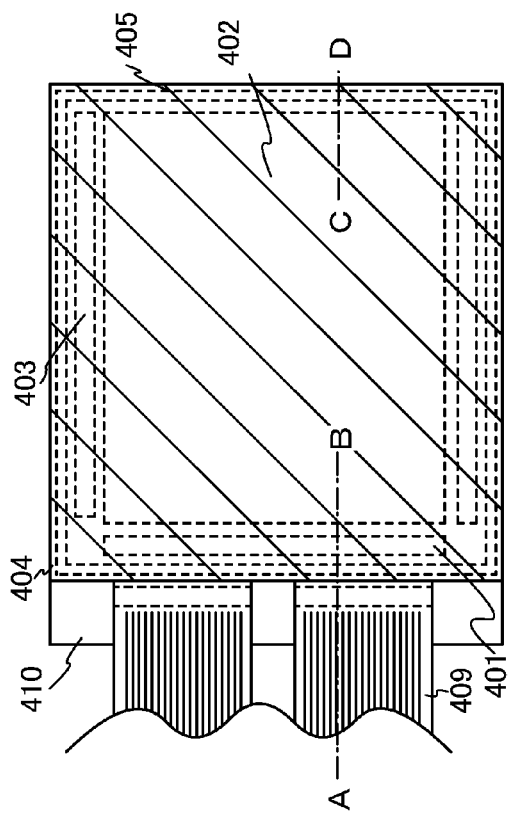
FIGS. 6A and 6B illustrate one embodiment of a display panel.
Figure 6B:
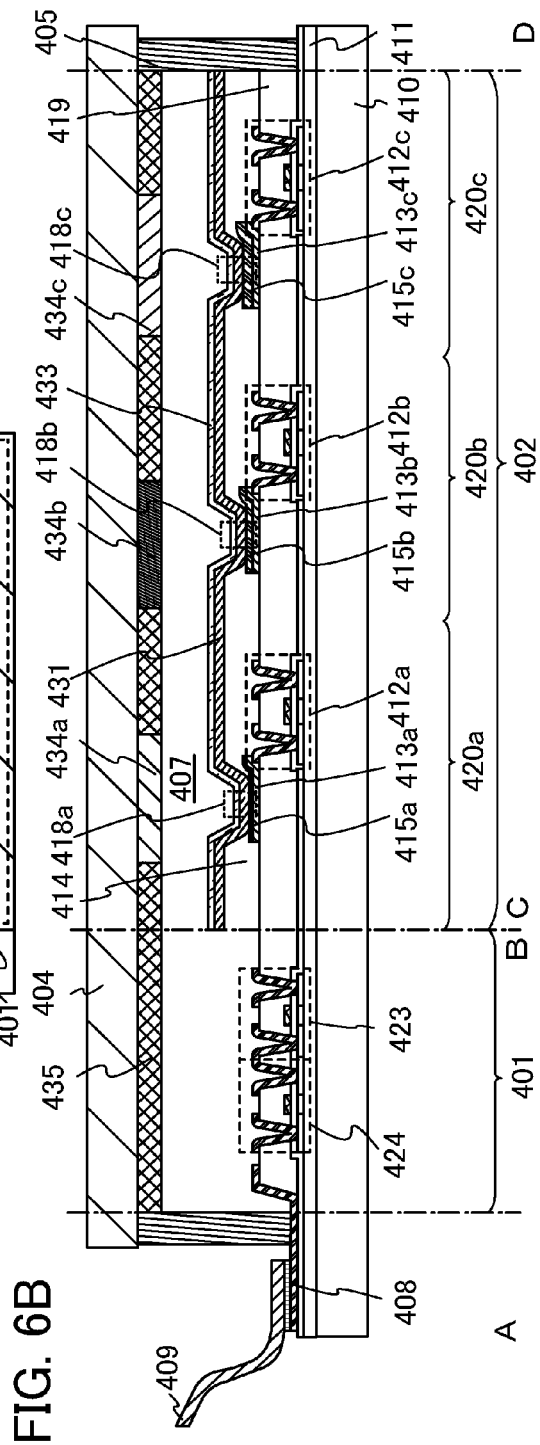

FIGS. 6A and 6B illustrate an example of the structure of a display panel in which an organic EL element is used as a display element. FIG. 6A is a plan view of the display panel. FIG. 6B is a cross-sectional view along A-B and C-D in FIG. 6A. An element substrate 410 is fixed to a sealing substrate 404 with a sealant 405, and includes driver circuit units (a source driver circuit 401 and a gate driver circuit 403) and a pixel portion 402 including a plurality of pixels.

A wiring 408 is a wiring for transmitting signals input to the source driver circuit 401 and the gate driver circuit 403, and receives a video signal, a clock signal, a start signal, a reset signal, and the like from a flexible printed circuit (FPC) 409 serving as an external input terminal Although only the FPC is illustrated here, a printed wiring board (PWB) may be attached to the FPC. The display panel in this specification includes not only a main body of the display panel but one with an FPC or a PWB attached thereto.

The driver circuit units (the source driver circuit 401 and the gate driver circuit 403) and the pixel portion 402 are formed over the element substrate 410. FIG. 6B illustrates the source driver circuit 401, which is the driver circuit unit, and three pixels in the pixel portion 402.

This embodiment explains an example in which the pixel portion 402 includes pixels of three colors: a blue (B) pixel 420a, a green (G) pixel 420b, and a red (R) pixel 420c. Note that this embodiment is not limited to this example, and a display panel can display multi-color images by including pixels of at least two colors in the pixel portion 402, or alternatively may be a display panel for single color display.

Pixels 420a, 420b, and 420c respectively include color filter layers 434a, 434b, and 434c; light-emitting elements 418a, 418b, and 418c; and transistors 412a, 412b, and 412c that are electrically connected to the light-emitting elements 418a, 418b, and 418c and function as switching transistors.

The color filter layer can be provided to correspond to the color of each pixel so as to fill openings provided in a light-shielding layer 435. For example, the color filter layer 434a of the blue (B) pixel 420a is blue; the color filter layer 434b of the green (G) pixel 420b is green; and the color filter layer 434c of the red (R) pixel 420c is red.

The light-emitting elements 418a, 418b, and 418c include respective reflective electrodes 413a, 413b, and 413c, an EL layer 431, and a light-transmitting electrode 433. The reflective electrodes 413a, 413b, and 413c or the light-transmitting electrode 433 is used as an anode and the rest of them is used as a cathode.

The EL layer 431 has at least a light-emitting layer. The EL layer 431 can have a stacked structure including a hole-injection layer, a hole-transport layer, an electron-transport layer, an electron-injection layer, and/or the like in addition to the light-emitting layer. In addition, a plurality of EL layers may be stacked, and a charge generation layer may be provided between one EL layer and another EL layer. When a plurality of light-emitting layers are stacked between the anode and the cathode, the light-emitting element can emit white light, for example.

Light-transmitting conductive layers 415a, 415b, and 415c may be provided between the respective reflective electrodes 413a, 413b, and 413c and the EL layer 431. The light-transmitting conductive layers 415a, 415b, and 415c have a function of adjusting the optical distance between the reflective electrodes 413a, 413b, and 413c and the light-transmitting electrode 433 in each pixel. By enhancing a desired spectrum with a microcavity for each light-emitting element, a display panel with high color purity can be provided.

FIG. 6B shows the top-emission display panel that includes a combination of light-emitting elements emitting white light and color filters; the display panel can be a top-emission display panel including light-emitting elements formed by a separate coloring method. A separate coloring method is a method by which materials for RGB are applied to respective pixels by evaporation or the like.

When the light-emitting layer is formed as a continuous film instead of being separately formed for every pixel using a metal mask, a reduction in yield and complication of the process due to the use of the metal mask can be avoided. Consequently, a high definition display panel with high color reproducibility can be achieved.

As the source driver circuit 401, a CMOS circuit including a combination of an n-channel transistor 423 and a p-channel transistor 424 is formed. The driver circuit may be constituted by a variety of circuits formed with transistors, such as a CMOS circuit, a PMOS circuit, or an NMOS circuit. This embodiment explains the example in which the source driver circuit and the gate driver circuit are formed over the substrate; however, the structure is not necessarily limited thereto, and part or all of the source driver circuit and the gate driver circuit can be formed outside the substrate instead of over the substrate.

An insulator 414 is formed to cover end portions of the reflective electrodes 413a, 413b, and 413c and the light-transmitting conductive layers 415a, 415b, and 415c. Here, the insulator 414 is formed using a positive type photosensitive acrylic resin film.

In order to improve the coverage, the insulator 414 is provided such that either an upper end portion or a lower end portion of the insulator 414 has a curved surface with a curvature. For example, when positive type photosensitive acrylic is used as a material for the insulator 414, it is preferable that only the upper end portion of the insulator 414 have a curved surface with a curvature radius (0.2 μm to 3 μm). The insulator 414 can be formed using either a negative type which becomes insoluble in an etchant by light irradiation or a positive type which becomes soluble in an etchant by light irradiation.

The sealing substrate 404 is attached to the element substrate 410 with the sealant 405; thus, the light-emitting elements 418a, 418b, and 418c are provided in a space 407 enclosed by the element substrate 410, the sealing substrate 404, and the sealant 405. The space 407 is filled with a filler such as an inert gas (e.g., nitrogen or argon), an organic resin, or the sealant 405. As the organic resin and the sealant 405, materials containing a hygroscopic substance may be used.

Note that as the sealant 405, an epoxy-based resin is preferably used. It is preferable that such a material do not transmit moisture or oxygen as much as possible. As the sealing substrate 404, a glass substrate, a quartz substrate, or a plastic substrate of fiberglass-reinforced plastics (FRP), polyvinyl fluoride (PVF), polyester, acrylic, or the like can be used.

As in this embodiment, an insulating film 411 serving as a base film may be provided between the element substrate 410 and a semiconductor layer of the transistor. The insulating film has a function of preventing diffusion of an impurity element from the element substrate 410, and can be formed with a single-layer structure or a stacked structure using one or more of a silicon nitride film, a silicon oxide film, a silicon nitride oxide film, and a silicon oxynitride film.

In this embodiment, there is no particular limitation on the structure of the transistor applicable to the display panel; for example, a staggered transistor or a planar transistor having a top-gate structure or a bottom-gate structure can be used. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned over and below a channel formation region with a gate insulating layer provided therebetween.

The gate electrode layer can be formed with a single-layer structure or a stacked structure using a metal material such as molybdenum, titanium, chromium, tantalum, tungsten, aluminum, copper, neodymium, or scandium or an alloy material that contains any of these materials as its main component.

For example, as a two-layer structure of the gate electrode layer, the following structures are preferable: a two-layer structure of an aluminum layer and a molybdenum layer stacked thereover, a two-layer structure of a copper layer and a molybdenum layer stacked thereover, a two-layer structure of a copper layer and a titanium nitride layer or a tantalum nitride layer stacked thereover, and a two-layer structure of a titanium nitride layer and a molybdenum layer. As a three-layer structure, it is preferable to employ a stacked structure in which a tungsten layer or a tungsten nitride layer, an alloy layer of aluminum and silicon or an alloy layer of aluminum and titanium, and a titanium nitride layer or a titanium layer are stacked.

The gate insulating layer can be formed with a single-layer structure or a stacked structure of a silicon oxide layer, a silicon nitride layer, a silicon oxynitride layer, and/or a silicon nitride oxide layer by plasma CVD, sputtering, or the like. Alternatively, a silicon oxide layer formed by CVD using an organosilane gas can be used as the gate insulating layer. As an organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), or trisdimethylaminosilane (chemical formula: $SiH(N(CH_3)_2)_3$) can be used.

A material of the semiconductor layer is not limited to a particular material and determined in accordance with characteristics needed for the transistors 412a, 412b, 412c, 423, and 424 as appropriate. Examples of a material that can be used for the semiconductor layer will be described.

The semiconductor layer can be formed using the following material: an amorphous semiconductor manufactured by sputtering or vapor-phase growth using a semiconductor material gas typified by silane or germane; a polycrystalline semiconductor formed by crystallizing the amorphous semiconductor with the use of light energy or thermal energy; a microcrystalline semiconductor; or the like. The semiconductor layer can be deposited by sputtering, LPCVD, plasma CVD, or the like.

For the semiconductor layer, a single crystal semiconductor (e.g., silicon or silicon carbide) can be used. When a single crystal semiconductor is used for the semiconductor layer, the size of the transistor can be reduced, leading to a higher density of pixels in a display portion. When a single crystal semiconductor is used for the semiconductor layer, an SOI substrate including a single crystal semiconductor layer can be used. Alternatively, a semiconductor substrate such as a silicon wafer may be used.

A typical example of an amorphous semiconductor is hydrogenated amorphous silicon, and a typical example of a crystalline semiconductor is polysilicon. Examples of polysilicon (polycrystalline silicon) are high-temperature polysilicon that contains polysilicon formed at a process temperature of 800° C. or higher as its main component, low-temperature polysilicon that contains polysilicon formed at a process temperature of 600° C. or lower as its main component, and polysilicon obtained by crystallizing amorphous silicon using an element that promotes crystallization or the like. Needless to say, a microcrystalline semiconductor or a semiconductor that includes a crystalline phase in part of a semiconductor layer can be used as described above.

Further, an oxide semiconductor may be used. Examples of an oxide semiconductor are an In—Sn—Ga—Zn—O-based oxide semiconductor which is an oxide of four metal elements; an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, and a Sn—Al—Zn—O-based oxide semiconductor which are oxides of three metal elements; an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, and In—Ga—O-based oxide semiconductor which are oxides of two metal elements; and an In—O-based oxide semiconductor, a Sn—O-based oxide semiconductor, and a Zn—O-based oxide semiconductor which are oxides of one metal element. Moreover, $SiO_2$ may be contained in the above oxide semiconductor. Here, for example, the In—Ga—Zn—O-based oxide semiconductor means an oxide containing at least In, Ga, and Zn, and there is no particular limitation on the composition ratio of the elements. The In—Ga—Zn—O-based oxide semiconductor may contain an element other than In, Ga, and Zn.

For the oxide semiconductor layer, a thin film expressed by a chemical formula of $InMO_3(ZnO)_m$ (m>0) can be used. Here, M represents one or more metal elements selected from Ga, Al, Mn, and Co. For example, M can be Ga, Ga and Al, Ga and Mn, or Ga and Co.

In the case where an In—Zn—O-based material is used as the oxide semiconductor, the atomic ratio is In/Zn=0.5 to 50, preferably In/Zn=1 to 20, further preferably In/Zn=1.5 to 15. When the atomic ratio of Zn is in the above preferred range, the field-effect mobility of the transistor can be improved. Here, when the atomic ratio of the compound is In:Zn:O=X:Y:Z, the relation Z>1.5X+Y is satisfied.

For the oxide semiconductor layer, it is possible to use an oxide semiconductor that has neither a single crystal structure nor an amorphous structure and is a crystalline oxide semiconductor having c-axis alignment (also referred to as a c-axis aligned crystalline oxide semiconductor (CAAC-OS)).

Examples of a material of wiring layers serving as source and drain electrode layers are an element selected from Al, Cr, Ta, Ti, Mo, and W; an alloy containing any of the above elements as its component; and an alloy film containing a combination of any of these elements. Further, in the case where heat treatment is performed, the conductive film preferably has heat resistance against the heat treatment. Since the use of aluminum alone brings disadvantages such as low heat resistance and a tendency to corrosion, aluminum is used in combination with a conductive material having heat resistance. As the conductive material having heat resistance, which is used in combination with aluminum, it is possible to use an element selected from titanium (Ti), tantalum (Ta), tungsten (W), molybdenum (Mo), chromium (Cr), neodymium (Nd), and scandium (Sc), an alloy containing any of these elements as its component, an alloy containing a combination of any of these elements, or a nitride containing any of these elements as its component.

As an insulating film 419 that covers the transistor, an inorganic insulating film or an organic insulating film formed by a dry method or a wet method can be used. For example, it is possible to use a silicon nitride film, a silicon oxide film, a silicon oxynitride film, an aluminum oxide film, a tantalum oxide film, or a gallium oxide film formed by CVD, sputtering, or the like. Moreover, an organic material such as polyimide, acrylic, benzocyclobutene, polyamide, or an epoxy resin can be used. Other than such organic materials, it is also possible to use a low-dielectric constant material (a low-k material), a siloxane-based resin, PSG (phosphosilicate glass), BPSG (borophosphosilicate glass), or the like.

Note that a siloxane-based resin corresponds to a resin including a Si—O—Si bond formed using a siloxane-based material as a starting material. A siloxane-based resin may include an organic group (e.g., an alkyl group or an aryl group) or a fluoro group as a substituent. In addition, the organic group may include a fluoro group. A siloxane-based resin is applied by a coating method and baked; thus, the insulating film 419 can be formed.

Note that the insulating film 419 may be formed by stacking a plurality of insulating films each formed using any of the above materials. For example, the insulating film 419 may have a structure in which an organic resin film is stacked over an inorganic insulating film.

Figure 7A:
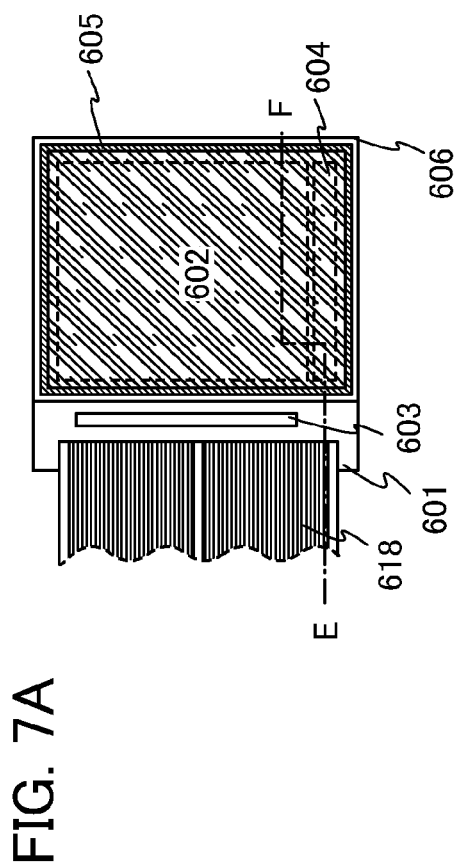
FIGS. 7A and 7B illustrate one embodiment of a display panel.
Figure 7B:
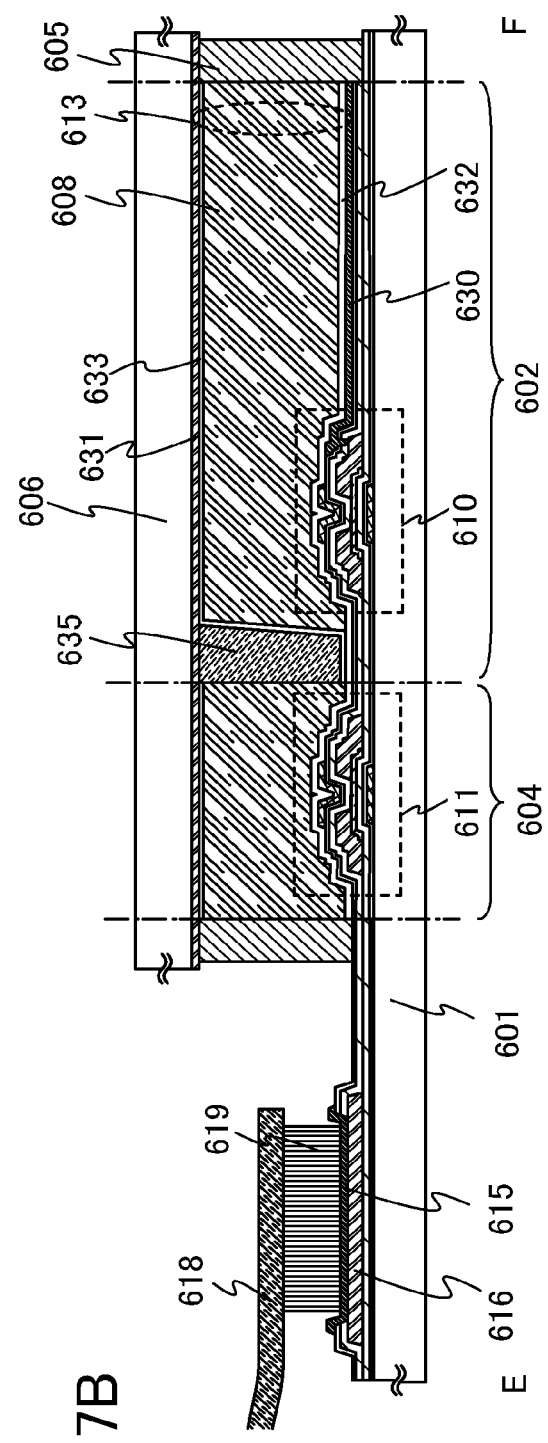

FIGS. 7A and 7B illustrate an example of a display panel including a liquid crystal element as a display element. FIG. 7A is a plan view of a display panel, and FIG. 7B is a cross-sectional view along E-F in FIG. 7A. The structure of the panel including the liquid crystal element shown in this embodiment can be employed as the structure of the shutter panel as appropriate.

In FIGS. 7A and 7B, a sealant 605 is provided so as to surround a pixel portion 602 and a scan line driver circuit 604 which are provided over a first substrate 601. A second substrate 606 is provided over the pixel portion 602 and the scan line driver circuit 604. Thus, the pixel portion 602 and the scan line driver circuit 604 are sealed together with a liquid crystal layer 608 by the first substrate 601, the sealant 605, and the second substrate 606.

In FIG. 7A, a signal line driver circuit 603 that is formed using a single crystal semiconductor film or a polycrystalline semiconductor film over a substrate separately prepared is mounted in a region different from the region surrounded by the sealant 605 over the first substrate 601. A variety of signals and potentials are supplied to the signal line driver circuit 603, the scan line driver circuit 604, and the pixel portion 602 from an FPC 618.

In FIGS. 7A and 7B, the display panel includes a connection terminal electrode 615 and a terminal electrode 616. The connection terminal electrode 615 and the terminal electrode 616 are electrically connected to a terminal of the FPC 618 via an anisotropic conductive film 619. The connection terminal electrode 615 is formed using the same conductive film as a first electrode layer 630 of the liquid crystal element, and the terminal electrode 616 is formed using the same conductive film as source and drain electrodes of transistors 610 and 611.

The pixel portion 602 and the scan line driver circuit 604, which are provided over the first substrate 601, each include a plurality of transistors. FIG. 7B illustrates the transistor 610 included in the pixel portion 602 and the transistor 611 included in the scan line driver circuit 604.

In FIG. 7B, a liquid crystal element 613, which is the display element, includes the first electrode layer 630, a second electrode layer 631, and the liquid crystal layer 608. Insulating films 632 and 633 serving as alignment films are provided so that the liquid crystal layer 608 is sandwiched therebetween. The second electrode layer 631 is provided on the second substrate 606 side, and the first electrode layer 630 and the second electrode layer 631 are stacked with the liquid crystal layer 608 placed therebetween.

A columnar spacer 635 is obtained by selective etching of an insulating film. The spacer is provided to control the thickness (cell gap) of the liquid crystal layer 608. Alternatively, a spherical spacer may be used.

In the case where a liquid crystal element is used as the display element, thermotropic liquid crystal, low-molecular liquid crystal, high-molecular liquid crystal, polymer dispersed liquid crystal, ferroelectric liquid crystal, anti-ferroelectric liquid crystal, or the like can be used. These liquid crystal materials exhibit a cholesteric phase, a smectic phase, a cubic phase, a chiral nematic phase, an isotropic phase, or the like depending on conditions.

Alternatively, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition that includes a liquid crystal showing a blue phase and a chiral agent has a short response time of 1 ms (millisecond) or less and has optical isotropy; therefore, the alignment process is not necessary and viewing angle dependence is small. In addition, since an alignment film does not need to be provided and rubbing treatment is unnecessary, electrostatic discharge caused by the rubbing treatment can be prevented and defects and damage of the display panel can be reduced in the manufacturing process. Thus, the productivity of the display panel can be increased.

The specific resistivity of the liquid crystal material is $1\times10^9$ Ω·cm or more, preferably $1\times10^{11}$ Ω·cm or more, further preferably $1\times10^{12}$ Ω·cm or more. The value of the specific resistivity in this specification is measured at 20° C.

For the display panel including the liquid crystal elements (the liquid crystal display panel), a twisted nematic (TN) mode, an in-plane-switching (IPS) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, or the like can be used.

The display panel in this embodiment can be a normally black liquid crystal display panel such as a transmissive liquid crystal display panel utilizing a vertical alignment (VA) mode. The vertical alignment mode is a method of controlling alignment of liquid crystal molecules of a liquid crystal display panel, in which liquid crystal molecules are aligned vertically to a panel surface when no voltage is applied. There are some examples of the vertical alignment mode, and for instance, a multi-domain vertical alignment (MVA) mode, a patterned vertical alignment (PVA) mode, or an advanced super view (ASV) mode can be employed. Moreover, it is possible to use a method called domain multiplication or multi-domain design, in which a pixel is divided into several regions (subpixels) and molecules are aligned in different directions in their respective regions.

In the display panel described in this embodiment, a black matrix (a light-shielding layer), an optical member (an optical substrate) such as a polarizing member, a retardation member, or an anti-reflection member, and the like are provided as appropriate. For example, circular polarization may be obtained by using a polarizing substrate and a retardation substrate. In addition, a backlight, a side light, or the like may be used as a light source for the liquid crystal display panel.

As a display method in the pixel portion, a progressive method, an interlace method, or the like can be employed. Further, color elements controlled in a pixel at the time of color display are not limited to three colors: R, G, and B (R, G, and B correspond to red, green, and blue). For example, R, G, B, and W (W corresponds to white); or R, G, B, and one or more of yellow, cyan, magenta, and the like can be used. Note that the size of display regions may be different between dots of color elements. This embodiment is not limited to the application to a display panel for color display but can also be applied to a display panel for monochrome display.

The display device according to one embodiment of the present invention can be provided by applying the display panel described in this embodiment to the display panel in Embodiment 1.

Note that this embodiment can be implemented in appropriate combination with the structures described in the other embodiments.

(Embodiment 4)

The display device according to one embodiment of the present invention may include a position input device called a touch panel. In this embodiment, a description is given using FIGS. 8A and 8B of an example of the structure of a shutter panel that is applicable to the display device in one embodiment of the present invention and includes a touch panel.

Figure 8A:
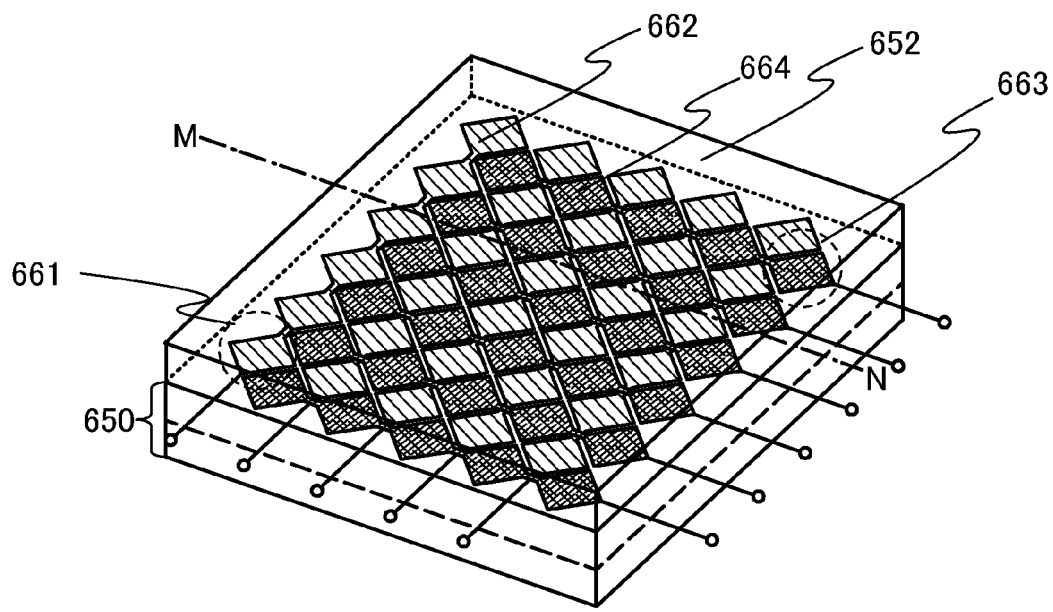
FIGS. 8A and 8B illustrate one embodiment of a shutter panel.
Figure 8B:
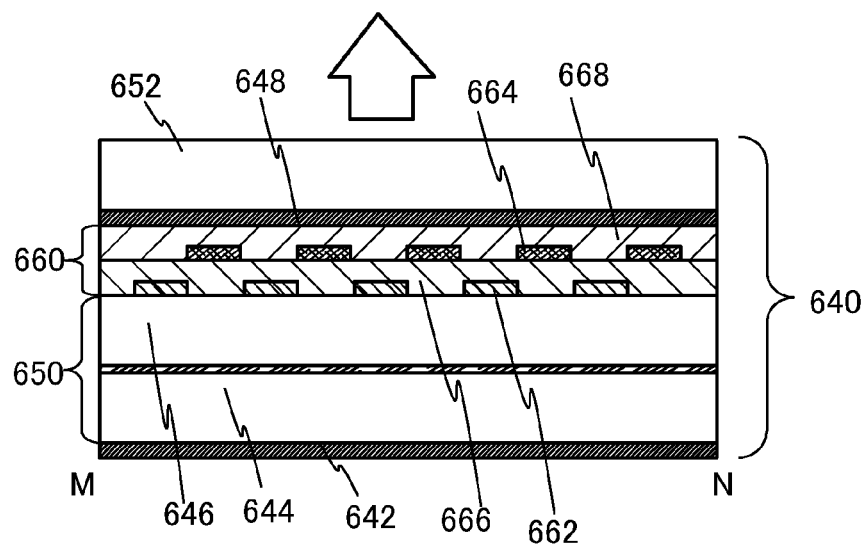

FIG. 8A is a perspective view of a shutter panel shown in this embodiment. FIG. 8B is a cross-sectional view along M-N in FIG. 8A. Note that in FIG. 8A, some of components (e.g., a polarizing plate) are omitted in order to avoid complexity of the drawing.

A shutter panel 640 illustrated in FIGS. 8A and 8B includes a first polarizing plate 642, a liquid crystal element unit 650, a touch panel unit 660 provided to overlap with the liquid crystal element unit 650, a second polarizing plate 648, and a substrate 652 provided in contact with the second polarizing plate 648.

The liquid crystal element unit 650 includes a plurality of liquid crystal elements provided between a substrate 644 and a substrate 646. The plurality of liquid crystal elements can have the structure shown in Embodiment 2.

An arrow in FIG. 8B indicates the direction of emitted light, which means that a display panel is provided on the first polarizing plate 642 side in the display device according to one embodiment of the present invention.

For the touch panel unit 660, the capacitive touch technology can be used, for example. FIGS. 8A and 8B show an example of the structure using a projected capacitive touch technology. The touch panel unit 660 includes a plurality of first electrodes 662, an insulating layer 666 covering the first electrodes 662, a plurality of second electrodes 664, and an insulating layer 668 covering the second electrodes 664.

The first electrode 662 has a structure where a plurality of rectangular conductive films 661 are connected to each other. The second electrode 664 has a structure where a plurality of rectangular conductive films 663 are connected to each other. The plurality of the first electrodes 662 and the plurality of the second electrodes 664 overlap with each other so that the positions of the rectangular conductive films 661 are different from those of the rectangular conductive films 663. Note that the shapes of the first electrodes 662 and the second electrodes 664 are not limited to the above.

The first electrode 662 and the second electrode 664 can be formed using a light-transmitting conductive material such as indium tin oxide containing silicon oxide, indium tin oxide, zinc oxide, indium zinc oxide, or zinc oxide to which gallium is added, for example.

One example of the shutter panel including the touch panel unit described in this embodiment has a structure in which the touch panel unit 660 is stacked between the first polarizing plate 642 and the second polarizing plate 648 which constitute the shutter panel. This structure can reduce the number of components as compared to the case where a shutter panel and a touch panel are manufactured separately and provided in a display device. As a result, manufacturing costs of the display device can be reduced. Moreover, the weight and thickness of the display device can be reduced.

Note that this embodiment can be implemented in appropriate combination with the structures described in the other embodiments.

(Embodiment 5)

The display device according to one embodiment of the present invention can be used for laptops and image reproducing devices provided with recording media (typically, devices that reproduce the content of recording media such as digital versatile discs (DVDs) and have displays for displaying the reproduced images). Other examples of electronic devices that can include the display device according to one embodiment of the present invention are mobile phones, portable game consoles, personal digital assistants, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATM), and vending machines. In this embodiment, specific examples of such electronic devices will be described with reference to FIGS. 9A to 9C.

Figure 9A:
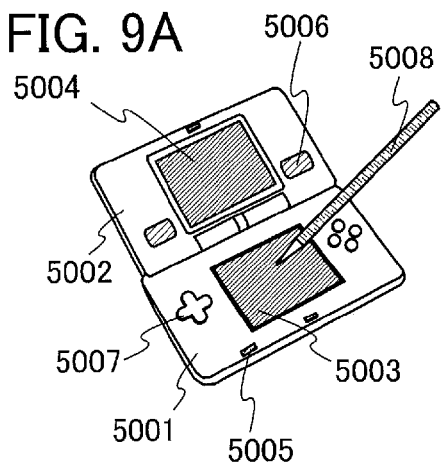
FIGS. 9A to 9C illustrate embodiments of electronic devices.

FIG. 9A illustrates a portable game console including a housing 5001, a housing 5002, a display portion 5003, a display portion 5004, a microphone 5005, speakers 5006, operation keys 5007, and a stylus 5008. The display device according to one embodiment of the present invention can be used as the display portion 5003 or the display portion 5004. By using the display device according to one embodiment of the present invention as the display portion 5003 or the display portion 5004, it is possible to provide a highly convenient portable game console capable of displaying 3D images. Although the portable game console in FIG. 9A has the two display portions 5003 and 5004, the number of display portions included in a portable game console is not limited to this.

Figure 9B:
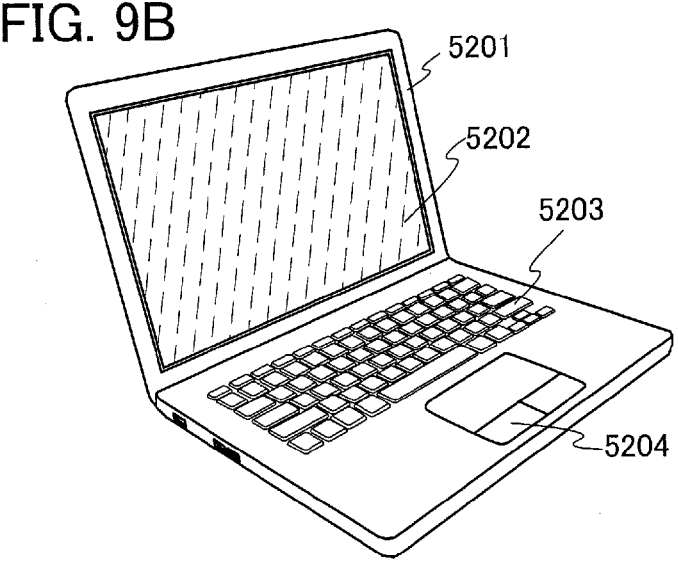

FIG. 9B illustrates a laptop personal computer including a housing 5201, a display portion 5202, a keyboard 5203, and a pointing device 5204. The display device according to one embodiment of the present invention can be used for the display portion 5202. By using the display device according to one embodiment of the present invention as the display portion 5202, it is possible to provide a highly convenient laptop personal computer capable of displaying 3D images.

Figure 9C:
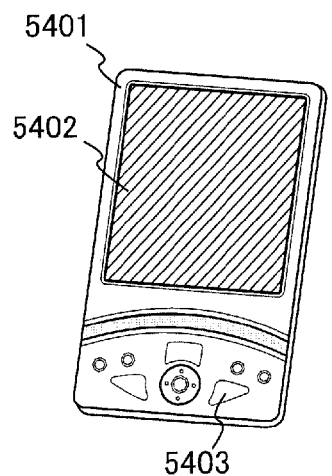

FIG. 9C illustrates a personal digital assistant including a housing 5401, a display portion 5402, and operation keys 5403. The display device according to one embodiment of the present invention can be used as the display portion 5402. By using the display device according to one embodiment of the present invention as the display portion 5402, it is possible to provide a highly convenient personal digital assistant capable of displaying 3D images.

This embodiment can be implemented in appropriate combination with the structures described in the other embodiments.

Explanation Of Reference

10: display panel, 20: shutter panel, 31: left eye, 32: right eye, 100: pixel, 200: optical shutter region, 300: display device, 301: viewer, 302: display portion, 303: distance sensor, 304: angular sensor, 311: display panel, 312: shutter panel, 313: application processor, 314: display panel control circuit, 315: shutter panel control circuit, 316: sensor control circuit, 401: source driver circuit, 402: pixel portion, 403: gate driver circuit, 404: sealing substrate, 405: sealant, 407: space, 408: wiring, 409: FPC (flexible printed circuit), 410: element substrate, 411: insulating film, 414: insulator, 419: insulating film, 423: n-channel transistor, 424: p-channel transistor, 431: EL layer, 433: electrode, 501: substrate, 502: substrate, 503: liquid crystal, 505: electrode, 506: electrode, 523: wiring, 524: capacitor wiring, 525: wiring, 526: wiring, 601: substrate, 602: pixel portion, 603: signal line driver circuit, 604: scan line driver circuit, 605: sealant, 606: substrate, 608: liquid crystal layer, 610: transistor, 611: transistor, 613: liquid crystal element, 615: connection terminal electrode, 616: terminal electrode, 618: FPC, 619: anisotropic conductive film, 630: electrode layer, 631: electrode layer, 632: insulating film, 635: spacer, 640: shutter panel, 642: polarizing plate, 644: substrate, 646: substrate, 648: polarizing plate, 650: liquid crystal element unit, 652: substrate, 660: touch panel unit, 661: conductive film, 662: first electrode, 663: conductive film, 664: second electrode, 666: insulating layer, 668: insulating layer, 100$a$: pixel, 100$b$: pixel, 200A: first liquid crystal element, 200B: second liquid crystal element, 412$a$: transistor, 413$a$: electrode, 415$a$: conductive layer, 418$a$: light-emitting element, 420$a$: pixel, 420$b$: pixel, 420$c$: pixel, 434$a$: color filter layer, 434$b$: color filter layer, 434$c$: color filter layer, 5001: housing, 5002: housing, 5003: display portion, 5004: display portion, 5005: microphone, 5006: speaker, 5007: operation key, 5008: stylus, 5201: housing, 5202: display portion, 5203: keyboard, 5204: pointing device, 5401: housing, 5402: display portion, 5403: operation key, 500$a$: shutter panel, 505$a$: electrode, 505$a$1: electrode, 506$a$: electrode, 506$a$1: electrode, 506$a$2: electrode, 507$a$1: liquid crystal element, 507$a$2: liquid crystal element, 516$a$1: electrode, 516$a$2: electrode, 516$a$3: electrode, 520$a$1: transistor, 520$a$2: transistor, 520$a$3: transistor, 521$a$: wiring, 522$a$1: wiring This application is based on Japanese Patent Application serial No. 2011-031103 filed with Japan Patent Office on Feb. 16, 2011, the entire contents of which are hereby incorporated by reference.

The invention claimed is:

1. A display device comprising:

a display panel; and a shutter panel comprising a first liquid crystal element and a second liquid crystal element adjacent to the first liquid crystal element, a sensor configured to detect a distance between the display device and a viewer by an infrared sensor and a gyro sensor, wherein in a first display state, a first light-shielding region and a first light-transmitting region are formed in the shutter panel by the first liquid crystal element and the second liquid crystal element, and light from the display panel is emitted through the first light-transmitting region, wherein in a second display state, a second light-shielding region larger than the first light-shielding region and a second light-transmitting region smaller than the first light-transmitting region are formed in the shutter panel by the first liquid crystal element and the second liquid crystal element, and light from the display panel is emitted through the second light-transmitting region, wherein the shutter panel is positioned in a direction of the light from the display panel, and wherein one of the first display state and the second display state is selected in accordance with the distance detected by the sensor.

2. The display device according to claim 1,
wherein the display panel includes a pixel unit including a first pixel and a second pixel adjacent to each other, and
wherein a pitch of the first light-shielding region is larger than a pitch of the pixel unit.

3. The display device according to claim 1, wherein the display panel comprises a light-emitting display element.

4. The display device according to claim 1, wherein the display panel comprises a liquid crystal display element.

5. A display device comprising:
a display panel;
a shutter panel comprising a first liquid crystal element and a second liquid crystal element adjacent to the first liquid crystal element; and
a sensor configured to detect a distance and an angle between the display device and a viewer by an infrared sensor and a gyro sensor,
wherein in a first display state, a first light-shielding region and a first light-transmitting region are formed in the shutter panel by the first liquid crystal element and the second liquid crystal element, and light from the display panel is emitted through the first light-transmitting region,
wherein in a second display state, a second light-shielding region larger than the first light-shielding region and a second light-transmitting region smaller than the first light-transmitting region are formed in the shutter panel by the first liquid crystal element and the second liquid crystal element, and light from the display panel is emitted through the second light-transmitting region,
wherein the shutter panel is positioned in a direction of the light from the display panel, and
wherein one of the first display state and the second display state is selected in accordance with the distance and the angle detected by the sensor.

6. The display device according to claim 5,
wherein the display panel includes a pixel unit including a first pixel and a second pixel adjacent to each other, and
wherein a pitch of the first light-shielding region is larger than a pitch of the pixel unit.

7. The display device according to claim 5, wherein the display panel comprises a light-emitting display element.

8. The display device according to claim 5, wherein the display panel comprises a liquid crystal display element.

9. A display device comprising:
a display panel;
a shutter panel comprising a first liquid crystal element, a second liquid crystal element, and a third liquid crystal element; and
a sensor configured to detect a distance and an angle between the display device and a viewer by an infrared sensor and a gyro sensor,
wherein the first liquid crystal element is interposed between the second liquid crystal element and the third liquid crystal element,
wherein the first liquid crystal element comprises a first electrode, the second liquid crystal element comprises a second electrode, and the third liquid crystal element comprises a third electrode,
wherein the second electrode is electrically connected to the third electrode through a wiring,
wherein in a first display state, a first light-shielding region and a first light-transmitting region are formed in the shutter panel by the first liquid crystal element, the second liquid crystal element, and the third liquid crystal element, and light from the display panel is emitted through the first light-transmitting region,
wherein in a second display state, a second light-shielding region larger than the first light-shielding region and a second light-transmitting region smaller than the first light-transmitting region are formed in the shutter panel by the first liquid crystal element, the second liquid crystal element, and the third liquid crystal element, and light from the display panel is emitted through the second light-transmitting region,
wherein the shutter panel is positioned in a direction of the light from the display panel, and
wherein one of the first display state and the second display state is selected in accordance with the distance and the angle detected by the sensor.

10. The display device according to claim 9,
wherein the display panel includes a pixel unit including a first pixel and a second pixel adjacent to each other, and
wherein a pitch of the first light-shielding region is larger than a pitch of the pixel unit.

11. The display device according to claim 9, wherein the display panel comprises a light-emitting display element.

12. The display device according to claim 9, wherein the display panel comprises a liquid crystal display element.

* * * * *